United States Patent
Morita et al.

(10) Patent No.: US 9,592,642 B2
(45) Date of Patent: Mar. 14, 2017

(54) METHOD FOR PRODUCING MULTI-LAYER POLYETHYLENE RESIN FOAM SHEET

(71) Applicant: JSP Corporation, Tokyo (JP)

(72) Inventors: Kazuhiko Morita, Utsunomiya (JP); Hirotoshi Kakuta, Utsunomiya (JP); Ryuichi Taniguchi, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 657 days.

(21) Appl. No.: 13/974,738

(22) Filed: Aug. 23, 2013

(65) Prior Publication Data

US 2014/0070442 A1 Mar. 13, 2014

(30) Foreign Application Priority Data

Sep. 13, 2012 (JP) ................. 2012-201181

(51) Int. Cl.
*B29C 44/24* (2006.01)
*B29D 7/01* (2006.01)
(Continued)

(52) U.S. Cl.
CPC ............... *B29D 7/01* (2013.01); *B29C 44/24* (2013.01); *B32B 5/20* (2013.01); *B32B 7/02* (2013.01); *B32B 27/065* (2013.01); *B32B 27/08* (2013.01); *B32B 27/327* (2013.01); *C08J 9/0061* (2013.01); *C08J 9/08* (2013.01); *C08J 9/122* (2013.01); *C08L 23/06* (2013.01); *C08L 23/0815* (2013.01); *C08L 23/142* (2013.01); *B29C 47/0021* (2013.01); *B29C 47/0026* (2013.01); *B29C 47/0066* (2013.01); *B29C 47/065* (2013.01); *B29C 47/56* (2013.01); *B29K 2023/0633* (2013.01); *B29K 2023/12* (2013.01);
(Continued)

(58) Field of Classification Search
CPC ............ B29D 7/01; B29C 47/56; B29C 44/24
See application file for complete search history.

(56) References Cited

U.S. PATENT DOCUMENTS

| | | | | |
|---|---|---|---|---|
| 5,660,922 | A * | 8/1997 | Herridge | B29C 47/0021 428/214 |
| 2004/0262802 | A1* | 12/2004 | Morita | B29C 44/22 264/45.9 |
| 2009/0069523 | A1* | 3/2009 | Itakura | C08F 297/083 526/348 |

FOREIGN PATENT DOCUMENTS

| | | |
|---|---|---|
| EP | 1 318 008 A1 | 6/2003 |
| JP | H06-91795 A | 4/1994 |

(Continued)

OTHER PUBLICATIONS

Wikipedia Contributors, "Melt Flow Index", Jan. 2011, http://en.wikipedia.org/wiki/Melt_Flow_Index.*

(Continued)

*Primary Examiner* — Galen Hauth
(74) *Attorney, Agent, or Firm* — Oliff PLC

(57) ABSTRACT

A method for producing a multi-layer foam sheet having a foam layer and a resin layer laminated on at least one side of the foam layer, includes coextruding a foamable molten resin composition which contains a low density polyethylene and a physical blowing agent and a molten resin composition which contains 80 to 20% by weight of a specific ethylene-propylene random copolymer and 20 to 80% by weight of a specific polyethylene resin so that the foamable molten resin composition forms the foam layer and the molten resin composition forms the resin layer.

4 Claims, 3 Drawing Sheets

(51) Int. Cl.
    *B32B 5/20*     (2006.01)
    *B32B 7/02*     (2006.01)
    *B32B 27/06*     (2006.01)
    *B32B 27/08*     (2006.01)
    *B32B 27/32*     (2006.01)
    *C08L 23/08*     (2006.01)
    *C08L 23/14*     (2006.01)
    *C08L 23/06*     (2006.01)
    *C08J 9/00*     (2006.01)
    *C08J 9/08*     (2006.01)
    *C08J 9/12*     (2006.01)
    *B29K 105/00*     (2006.01)
    *B29C 47/00*     (2006.01)
    *B29K 23/00*     (2006.01)
    *B29L 9/00*     (2006.01)
    *B29C 47/56*     (2006.01)
    *B29C 47/06*     (2006.01)

(52) U.S. Cl.
    CPC ... *B29K 2105/0094* (2013.01); *B29L 2009/00* (2013.01); *B32B 2250/03* (2013.01); *B32B 2250/05* (2013.01); *B32B 2250/40* (2013.01); *B32B 2266/025* (2013.01); *B32B 2266/08* (2013.01); *B32B 2270/00* (2013.01); *B32B 2307/552* (2013.01); *B32B 2307/56* (2013.01); *B32B 2307/718* (2013.01); *B32B 2553/02* (2013.01); *C08J 2201/03* (2013.01); *C08J 2203/02* (2013.01); *C08J 2203/06* (2013.01); *C08J 2203/184* (2013.01); *C08J 2205/052* (2013.01); *C08J 2323/06* (2013.01); *C08J 2423/06* (2013.01)

(56) References Cited

FOREIGN PATENT DOCUMENTS

JP     H10-138424 A     5/1998
JP     A-2007-284126     11/2007

OTHER PUBLICATIONS

Dec. 3, 2013 European Extended Search Report issued in European Application No. 13182194.4.
Mar. 30, 2016 Decision to Grant a Patent issued in Japanese Patent Application No. 2012-201181.

* cited by examiner

METHOD FOR PRODUCING MULTI-LAYER POLYETHYLENE RESIN FOAM SHEET

BACKGROUND OF THE INVENTION

Field of the Invention

The present invention relates to a method for producing a multi-layer polyethylene resin foam sheet.

Description of Related Art

A polyethylene resin foam sheet has been utilized in a wide variety of fields. For example, a polyethylene resin foam sheet is now suitably used in various applications, such as shock absorbing materials (e.g. packaging materials and packing materials) and partitions, because of its flexibility and cushioning property. However, a polyethylene resin foam sheet, when composed only of a polyethylene resin foam layer, fails to show environmental stress cracking resistance (hereinafter referred to as ESCR). Namely, when the sheet is exposed simultaneously both to a liquid containing a surfactant or the like chemical and to external stresses, environmental stress cracking or rupture of the sheet is apt to be caused. Thus, there has been a strong demand for improving ESCR of polyethylene resin foam sheets.

To cope with this demand, there is proposed a laminated foam sheet in which an oriented polypropylene film (hereinafter referred to "OPP film") is laminated on a surface of a polyethylene resin foam layer. Since the OPP film has high ESCR, especially high resistance to surfactants, the laminated foam sheet has excellent ESCR and yet shows excellent flexibility and shock absorbing property inherent to its polyethylene resin foam layer. Moreover, owing to the OPP film, the laminated foam sheet excels in aesthetics in terms of surface smoothness and gloss and in stiffness. With a view toward further improving ESCR and aesthetics of the laminated foam sheet, a proposal is made to laminate OPP films on both sides of a polyethylene resin foam layer.

As a method for preparing an OPP film-bearing laminated foam sheet, there is proposed a method (first method) in which an OPP film is first applied with a coating of an adhesive, the resulting OPP film being subsequently laminated on one or both sides of a polyethylene resin foam layer. The first method is excellent in productivity since both sides of the polyethylene resin foam layer may be simultaneously laminated with the OPP films. However, the first method in which an adhesive must be used has a problem because, when the laminated foam sheet is immersed in a liquid containing a surfactant or the like chemical, the adhesive gradually dissolves in the liquid so that inter-layer peeling is liable to occur between the OPP films and the polyethylene resin foam layer.

As a method for preparing a laminated foam sheet, a method (second method) is also known which includes kneading polypropylene (PP) and polyethylene (PE) using an extruder to obtain a molten resin composition, and extruding the molten resin composition between a polyethylene resin foam layer and an OPP film to bond the OPP film and the polyethylene resin foam layer to each other with the resin composition serving as an adhesive layer (see, for example, Japanese Kokai Publication JP-A-2007-284126).

When the second method is adopted for producing a laminated foam sheet in which an OPP film is laminated on each side of the polyethylene resin foam layer, the molten resin composition is extruded and applied onto one of the both sides of the polyethylene resin foam layer to form thereon the adhesive layer, with which the OPP film is brought into contact. It is inevitable to separately conduct the steps of laminating the OPP films on both sides of the polyethylene resin foam layer. Accordingly, the second method has a problem of poor production efficiency because an increased number of the production steps are required. Further, the laminated foam sheet is likely to warp when one side of the polyethylene resin foam layer is heated by application with the molten resin composition. Warp of the laminated foam sheets causes difficulty in handling and deterioration of sealing property (especially when the laminated foam sheets are used as a packing material) and appearance.

SUMMARY OF THE INVENTION

In order for a polyethylene resin foam sheet to be suitably usable for various applications, such as shock absorbing packing materials and partitions, it is strongly desired that the polyethylene resin foam sheet not only has excellent ESCR and aesthetics but also exhibits excellent flexibility and cushioning property. In order to achieve excellent flexibility and cushioning property of a polyethylene resin foam sheet, it is important that a polyethylene resin foam layer which constitutes the foam sheet should have a sufficiently high closed cell content as well as excellent flexibility and cushioning property.

In this circumstance, the present inventors have made a study on a method (third method) for producing a laminated foam sheet, in which a multi-layer polyethylene resin foam sheet composed of a polyethylene resin foam layer and an adhesive layer employed in the second method is first prepared by coextrusion, the obtained multi-layer polyethylene resin foam sheet being subsequently laminated with an OPP film by fusion bonding.

It has been found, however, to be difficult to form a polyethylene resin foam layer having a high closed cell content by the third method, when a polyolefin adhesive layer containing PE and PP as proposed in the second method is used for producing a multi-layer polyethylene resin foam sheet by coextrusion. Further, with the third method, it is difficult to achieve sufficiently high bonding strength between the polyethylene resin foam layer and the OPP film.

The objective problem of the present invention is to provide a method capable of producing a multi-layer polyethylene resin foam sheet which has a polyethylene resin foam layer with a high closed cell content and a polyolefin resin layer laminated on the foam layer, which has, by itself, excellent ESCR and excellent aesthetics in appearance and which is suitable for lamination with an OPP film and, therefore, for preparing a laminated foam sheet having further improved ESCR and aesthetics.

In accordance with one aspect of the present invention, there is provided a method for producing a multi-layer polyethylene resin foam sheet having a polyethylene resin foam layer and a polyolefin resin layer laminated on at least one side of the polyethylene resin foam layer, comprising the steps of:

providing a foamable molten polyethylene resin composition comprising a polyethylene resin (A) containing a low density polyethylene, and a physical blowing agent, providing a molten polyolefin resin composition comprising 20 to 80% by weight of an ethylene-propylene random copolymer obtained using a metallocene polymerization catalyst and having a melting point of 135° C. or lower, and 20 to 80% by weight of a polyethylene resin (B) selected from the group consisting of low density polyethylene, linear low density polyethylene, high density polyethylene and mixtures thereof, wherein the sum of the ethylene-propylene random copolymer and the polyethylene resin (B) is 100% by weight, and coextruding the foamable molten polyethylene resin composition and the molten polyolefin resin composition to form the multi-layer polyethylene resin foam sheet wherein the foamable molten polyethylene resin composition forms the polyethylene resin foam layer and the molten polyolefin resin composition forms the polyolefin resin layer.

In a second aspect, the present invention provides the method according to the above first aspect, wherein the molten polyolefin resin composition has a melt viscosity $\eta_{PO}$ of not lower than 500 Pa·s and not higher than 1,500 Pa·s at a temperature of 190° C. and a shear rate of 100 sec$^{-1}$.

In a third aspect, the present invention provides the method according to the above first or second aspect, wherein a ratio $\eta_{PP}/\eta_{PEB}$ of a melt viscosity $\eta_{PP}$ of the ethylene-propylene random copolymer at 190° C. and a shear rate of 100 sec$^{-1}$ to a melt viscosity $\eta_{PEB}$ of the polyethylene resin (B) at 190° C. and at a shear rate of 100 sec$^{-1}$ is not lower than 0.4 and not higher than 1.5.

In a fourth aspect, the present invention provides the method according to claim any one of the above first to third aspects, wherein the polyethylene resin (B) is a linear low density polyethylene obtained using a metallocene polymerization catalyst.

In a fifth aspect, the present invention provides the method according to any one of the above first to fourth aspects, wherein the polyethylene resin foam layer has an apparent density of not lower than 90 kg/m$^3$ and not higher than 600 kg/m$^3$ and a closed cell content of not lower than 70%.

The method of the present invention can easily produce a multi-layer polyethylene resin foam sheet having a polyethylene resin foam layer and a polyolefin resin layer provided on at least one side of the foam layer. The multi-layer polyethylene resin foam sheet obtained by the method of the present invention has excellent ESCR and excellent aesthetics in appearance. Additionally, the polyethylene resin foam layer of the multi-layer polyethylene foam sheet has a high closed cell content and a strong adhesion strength to the resin layer. Moreover, the multi-layer polyethylene foam sheet is suitable for lamination with an OPP film and, therefore, for preparing a laminated foam sheet having further improved ESCR and aesthetics.

BRIEF DESCRIPTION OF THE DRAWINGS

Other objects and advantages of the present invention will become more apparent from the detailed description of the preferred embodiments of the present invention which follows, when considered in light of the accompanying drawings in which.

DETAILED DESCRIPTION OF THE PREFERRED EMBODIMENTS

I. Production Method for Multi-Layer Polyethylene Resin Foam Sheet

The present invention is directed to a method for producing a multi-layer polyethylene resin foam sheet having a polyethylene resin foam layer and a polyolefin resin layer laminated on at least one side of the polyethylene resin foam layer. For the purpose of brevity, the terms "multi-layer polyethylene resin foam sheet", "polyethylene resin foam layer" and "polyolefin resin layer" are occasionally referred to simply as "multi-layer foam sheet", "foam layer" and "resin layer", respectively.

Figure 1:
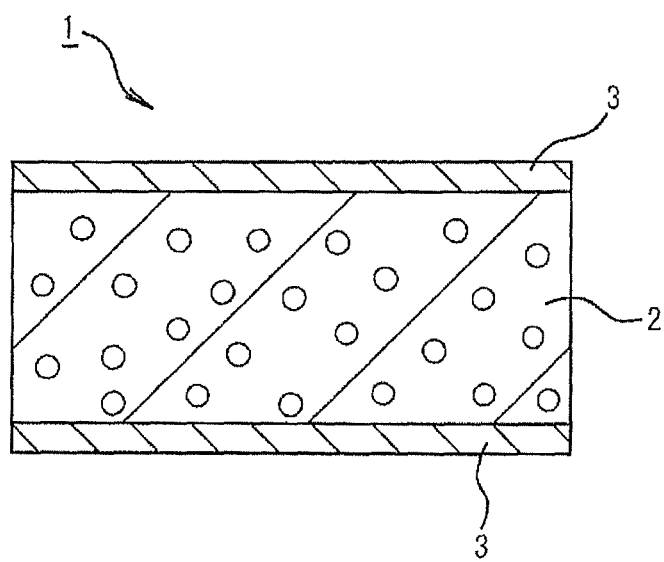
FIG. 1 is a schematic cross-sectional view showing an embodiment of a multi-layer polyethylene resin foam sheet obtained by a method according to the present invention.
Figure 2:
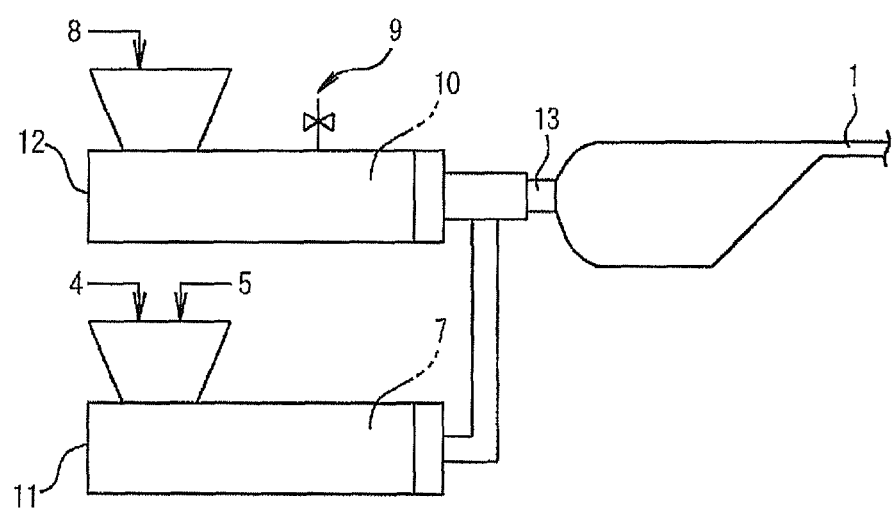
FIG. 2 is a schematic explanatory view showing a device suitable for carrying out a method according to the present invention.

The method for producing a multi-layer foam sheet will be described below with reference to FIG. 1 and FIG. 2. In FIG. 1, designated generally as 1 is a multi-layer foam sheet having a foam layer 2 and a pair of resin layers 3 laminated on both sides of the foam layer 2. FIG. 2 is a schematic illustration of an example of a device useful for producing the multi-layer foam sheet 1.

Referring to FIG. 2, a polyethylene resin (A) 8, which is used for forming the foam layer 2 as described in detail hereinafter, is fed to a first extruder 12 and is heated and melted. A physical blowing agent 9 is also injected into the first extruder 12 where the polyethylene resin (A) 8 is kneaded with the blowing agent 9 to form a foamable molten polyethylene resin composition 10. If desired, a cell controlling agent and the like additives may be fed as appropriate to the first extruder 12 together with the polyethylene resin (A) 8 for incorporation into the foamable molten polyethylene resin composition 10. A polyethylene resin (B) 4 and a polypropylene resin 5, which are used for forming the resin layer 3 as described in detail hereinafter, are fed to a second extruder 11, where they are melted and kneaded to form a molten polyolefin resin composition 7.

The foamable molten polyethylene resin composition 10 and the molten polyolefin resin composition 7 are, after having been adjusted to their respective appropriate temperatures, fed to a circular die 13 and coextruded therethrough to form a tubular multi-layer foam sheet having the foam layer 2 that is formed from the foamable molten polyethylene resin composition and a pair of resin layers 3 that are laminated on both sides of the foam layer 2 and each formed from the molten polyolefin resin composition. The tubular sheet is then cooled by any suitable cooling device (not shown). For example, the tubular sheet is drawn over a cooling mandrel so that the inner surface of the tubular sheet is cooled by contact with an outer surface of the cooling mandrel. The cooled tubular sheet is further drawn and slit along the extrusion direction to obtain a flat multi-layer polyethylene resin foam sheet 1 shown in FIG. 1. Although two resin layers 3 are laminated on both sides of the foam layer 2 in the above embodiment, the present invention is not limited only to the above embodiment, i.e. only one side of the foam layer 2 may be laminated with the resin layer 3.

The circular die 13, extruders 11 and 12, and device (not shown) for slitting the tubular sheet may be those which are customarily employed in the field of extrusion foaming processes. In the specific embodiment shown in FIG. 2, the first and second extruders 12 and 11 are each composed of a single extruder. However, the extruder is not limited to such an embodiment, i.e. a tandem extruder system in which two or more extruders are connected in series may be also employed.

As the cooling device, any known device customarily used for cooling extruded products may be used as appropriate. For example, the cooling device may be constructed such as a cylindrical cooling pipe, as an assembly of multiple cooling ring pipes arranged in the extrusion direction or as a cage of cooling pipes. For reasons of simple structure and good cooling efficiency, a cooling mandrel in a cylindrical form is preferably used.

The slitting of the tubular sheet may be carried out during its passage through the cooling device. Alternatively, the tubular sheet may be slit after its passage through the cooling device.

The method of cooling the tubular sheet is not limited only to the above method in which the tubular sheet is drawn over the cooling mandrel for contacting the inner surface thereof with the outer surface of the cooling mandrel. Thus, the above cooling method may be modified by, for example, additionally impinging cooling air on the outer and/or inner surface of the tubular sheet.

Rather than slitting the tubular sheet, the tubular sheet may be passed through a nip between pinch rolls, while the inside surface of the tubular sheet is still in a softened state. As a result, the tubular sheet is flattened with halves of its inside surface being bonded to each other to obtain a flat sheet.

In the coextrusion step, it is preferred that the streams of the foamable molten polyethylene resin composition 10 and the molten polyolefin resin composition 7 are first combined and laminated within the circular die 13 and then extruded from the circular die 13 into the tubular foam sheet 1 because improved bonding strength is obtainable between the foam layer 2 and the resin layer 3.

In the above embodiment, the multi-layer foam sheet 1 is produced using a circular die 13. The extrusion foaming method using the circular die is preferred because it allows for producing a foam sheet having a large width and a low apparent density. It is, however, possible to carry out the coextrusion using a flat die. The production method for the multi-layer foam sheet 1 using a flat die is substantially the same as that using a circular die, except that extrusion and cooling steps are carried out using different devices and that no slitting step is required in the case of using the flat die.

Foamable Molten Polyethylene Resin Composition 10:

The foamable molten polyethylene resin composition 10 is produced by kneading the polyethylene resin (A) together with a blowing agent.

As used herein, the term "polyethylene resin" (inclusive of the polyethylene resin (A) and hereinafter described polyethylene resin (B)) refers to a resin that has at least 50 mole % of ethylene units. Specific examples of the polyethylene resin include low density polyethylene (PE-LD), linear low density polyethylene (PE-LLD), high density polyethylene (PE-HD), ethylene-vinyl acetate copolymer (EVAC), ethylene-methyl methacrylate copolymer (EMMA) and mixtures thereof. In general, the low density polyethylene (PE-LD) generally has a long chain branched structure and a density of not less than 910 kg/m$^3$ and less than 930 kg/m$^3$; the linear low density polyethylene (PE-LLD) is a linear copolymer of ethylene and a $C_4$-$C_8$ α-olefin and has a density of not less than 910 kg/m$^3$ and not more than 940 kg/m$^3$; and the high density polyethylene (PE-HD) has a density of more than 940 kg/m$^3$.

The polyethylene resin (A) must contain low density polyethylene. Stated otherwise, the polyethylene resin (A) must be composed only of low density polyethylene or must be a mixture of low density polyethylene and one or more other polyethylene resins. Because of the presence of the low density polyethylene, the polyethylene resin (A) can exhibit good extrusion foaming property and allows the formation of the foam layer 2 having a low apparent density and a closed cellular structure.

When the polyethylene resin (A) is a mixture of low density polyethylene and one or more other polyethylene resins, it is preferred that (a) the mixture contains the low density polyethylene as its major component, or (b) the mixture contains high density polyethylene as its major component with the low density polyethylene being contained in an amount of 10 to 50% by weight. Here, "the mixture contains the low density polyethylene as its major component" is intended to mean that the low density polyethylene is contained in the polyethylene resin (A) in an amount of 50% by weight or more, and "the mixture contains high density polyethylene as its major component" is intended to mean that the high density polyethylene is contained in the polyethylene resin (A) in an amount of 50% by weight or more.

The foamable molten polyethylene resin composition 10 may contain one or more additional resins other than the polyethylene resin (A) as long as the object and effect of the present invention are not adversely affected. Examples of such additional resin include styrene-based resins such as polystyrene, elastomers such as ethylene-octene copolymers and ethylene-propylene rubbers, butane-based resins such as polybutene, and vinyl chloride resins such polyvinyl chloride. The amount of the additional resin is preferably 40 parts by weight or less, more preferably 25 parts by weight or less, particularly preferably 10 parts by weight or less, per 100 parts by weight of the polyethylene resin (A) contained in the foamable molten polyethylene resin composition 10.

It is preferred that the polyethylene resin (A) has a melt flow rate (MFR) of 0.3 g/10 min or more and 20 g/10 min or less. When a foamable resin composition is extruded through a die into a foam sheet, shear heat is likely to be generated in the foamable resin composition due to an increase of pressure during its passage through the die. The generation of the heat may cause formation of open cells in the extruded foam sheet. In the method of the present invention, when MFR of the polyethylene resin (A) is 0.3 g/10 min or more, such heat generation and formation of open cells can be effectively suppressed. On the other hand, when MFR of the polyethylene resin (A) is 20 g/10 min or less, the foam sheet 2 obtained has high mechanical strength. From the above points of view, MFR of the polyethylene resin (A) is more preferably 1.0 g/10 min or more, still more preferably 2.0 g/10 min or more, while the upper limit of MFR of the polyethylene resin (A) is more preferably 15 g/10 min, still more preferably 10 g/10 min.

As used herein, "melt flow rate" (MFR)" is measured according to JIS K7210 (1999) under condition D (at a temperature of 190° C. and a nominal load of 2.16 kg). When the polyethylene resin (A) is in the form of a mixture, the mixture is melted and kneaded in an extruder before measuring the MFR thereof.

It is also preferred that the polyethylene resin (A) has a melt tension (MT) of 20 mN or more and 400 mN or less at 190° C. When the melt tension (MT) of the polyethylene resin (A) is 20 mN or more, suitable foamability of the foamable molten polyethylene resin composition 10 is obtained so that a light weight foam layer may be obtained. When the melt tension (MT) of the polyethylene resin (A) is 400 mN or less, on the other hand, generation of shear heat in the resin composition 10 due to an increase of pressure may be suppressed during its passage through the die. Generation of excessive shear heat is undesirable, because open cells are formed in the extruded foam sheet 2, which may result in deterioration of the stiffness or rigidity thereof.

For reasons of obtaining a light weight foam layer 2, the melt tension (MT) of the polyethylene resin (A) is more preferably 30 mN or more, still more preferably 40 mN or more. For reasons of suppressing heat generation in the die and of obtaining a good stiffness foam layer, the melt tension (MT) of the polyethylene resin (A) is more preferably 300 mN or less, still more preferably 200 mN or less, particularly preferably 100 mN or less. When the polyethylene resin (A) is in the form of a mixture, MT thereof should be measured after the mixture has been melted and kneaded in an extruder.

Method of Measuring Melt Tension:

The melt tension (MT) may be measured as appropriate using Capirograph 1D (manufactured by Toyo Seiki Seisaku-Sho, Ltd.). Concretely, in a cylinder having a cylinder diameter of 9.55 mm and a length of 350 mm is set an orifice having a nozzle diameter of 2.095 mm and a length of 8.0 mm. The cylinder and the orifice are set at a temperature of 190° C. A dried specimen in a required amount is charged into the cylinder and an extruding piston is inserted into the cylinder. This is then held for 4 minutes to melt the specimen. The molten resin is then extruded in the form of a string through the orifice at a piston speed of 10 mm/minute. The extruded string is put on a tension-detecting pulley having a diameter of 45 mm and is taken up on a take-up roller while increasing the take-up speed at a constant take-up acceleration rate such that the take-up speed increases from 0 m/minute to 200 m/minute through a period of 4 minutes to measure the maximum tension immediately before the string breaks. The above measurement is carried out for ten different samples. From the obtained ten measured maximum values, the largest three values and the smallest three values are omitted. The arithmetic mean of the rest four maximum values is the melt tension (mN) as used for the purpose of the present invention.

When the resin string does not break up to the take-up speed of 200 m/minute in the above method for the measurement of the melt tension, then the melt tension (mN) is as measured by the take-up operation at a constant take-up speed of 200 m/minute. More concretely, in the same manner as that described above, the molten resin is extruded from the orifice in the form of a string, and the extruded resin string is put on a tension-detecting pulley and taken up on a take-up roller while increasing the take-up speed at a constant take-up acceleration rate such that the take-up speed increases from 0 m/minute to 200 m/minute through a period of 4 minutes. When the take-up speed of 200 m/minute is reached, recording of the melt tension data is started and continued for 30 seconds to obtain a tension load curve showing relationship between melt tension with time. From the obtained tension load curve in a measuring period of 30 seconds, the maximum tension (Tmax) and minimum tension (Tmin) are determined. The arithmetic mean (Tave) of the maximum tension (Tmax) and minimum tension (Tmin) is the melt tension as used for the purpose of the present invention. The Tmax as used herein is a value obtained by dividing a sum of the tension values of the peaks detected in the tension load curve by the number of the peaks, while the Tmin as used herein is a value obtained by dividing a sum of the tension values of the dips detected in the tension load curve by the number of the dips. The above measurement is desirably carried out such that inclusion of air bubbles in the string is prevented as much as possible at the time of extrusion of the molten resin through the orifice into the string form.

Physical Blowing Agent:

As the physical blowing agent to be contained in the foamable molten polyethylene resin composition 10, there may be used any physical blowing agent, such as an inorganic physical blowing agent or an organic blowing agent, that has been conventionally used in the production of polyethylene resin foams.

Examples of the inorganic blowing agent include oxygen, nitrogen, carbon dioxide and air. Examples of the organic blowing agent include aliphatic hydrocarbons such as propane, n-butane, i-butane, n-pentane, i-pentane, n-hexane and i-hexane; alicyclic hydrocarbons such as cyclopentane and cyclohexane; chlorinated hydrocarbons such as methyl chloride and ethyl chloride; fluorinated hydrocarbons such as 1,1,1,2-tetrafluoroethane and 1,1-difluoroethane. These blowing agents may be used alone or in the form of a mixture of two or more thereof. From the viewpoint of expansion efficiency, n-butane, i-butane or a mixture thereof is preferably used as the physical blowing agent of the polyethylene resin (A). From the viewpoint of ecology and production costs, carbon dioxide is preferred.

The amount of the blowing agent in the foamable molten polyethylene resin composition 10 varies with the kind of the blowing agent and an intended apparent density of the foam layer to be produced but is generally 0.05 part by weight or more and 10.0 parts by weight or less, preferably 0.1 part by weight or more and 5.0 parts by weight or less, more preferably 0.2 part by weight or more and 3.0 parts by weight or less, per 100 parts by weight of the resin components contained in the foamable molten polyethylene resin composition 10.

Cell Controlling Agent:

A cell controlling agent may be incorporated into the foamable molten polyethylene resin composition 10. Examples of the cell controlling agent include metal borate (such as zinc borate, magnesium borate and borax), sodium chloride, aluminum hydroxide, talc, zeolite, silica, calcium carbonate, sodium hydrogen carbonate, sodium 2,2-methylenebis(4,6-tert-butylphenyl)phosphate, sodium benzoate, calcium benzoate, aluminum benzoate and sodium stearate. A mixture of sodium hydrogen carbonate and citric acid or a mixture of a monoalkali salt of ctric acid and sodium hydrogen carbonate may be also used as the cell controlling agent. The above cell controlling agents may be used singly or as a mixture of two or more thereof.

The amount of the cell controlling agent in the foamable molten polyethylene resin composition 10 varies with an intended cell size of the foam layer 2 to be produced but is, in consideration of easiness in cell size control, generally 0.01 part by weight or more and 5.0 parts by weight or less, preferably 0.05 part by weight or more and 2.0 parts by weight or less, per 100 parts by weight of the resin components contained in the foamable molten polyethylene resin composition 10.

The foamable molten polyethylene resin composition 10 may additionally contain one or more additives such as a nucleating agent, an antioxidant, a thermal stabilizing agent, an antistatic agent, an electric conductivity imparting agent, a UV absorbing agent, a flame retardant and an inorganic filler.

It is preferable to extrude the foamable molten polyethylene resin composition 10 at a temperature of generally 100 to 140° C., more preferably 110 to 135° C., for producing the desirable foam layer 2.

Molten Polyolefin Resin Composition 7:

The molten polyolefin resin composition 7 is produced by melting and kneading a polyethylene resin (B) and a polypropylene resin.

In a multi-layer foam sheet composed of a foam layer containing a polyethylene resin and a resin layer containing a polypropylene resin, it is important that the foam layer and the resin layer should be strongly bonded to each other and that the multi-layer foam sheet should show good ESCR. As described previously, however, a polyethylene resin is known to have poor ESCR and to be difficult to be fusion-bonded to a polypropylene resin layer with high adhesion strength. In order for a resin layer composed of a polyethylene resin and a polypropylene resin to achieve good ESCR, it is necessary that the polypropylene resin forms a matrix phase. When the polypropylene resin forms a matrix phase, however, the resulting resin layer cannot be sufficiently fuse-bonded to the polyethylene foam layer. Namely, an attempt to improve ESCR using the conventional technique results in lowering of the bonding strength between the foam layer and resin layer; i.e. achievement of improved ESCR is incompatible with achievement of improved bonding between the foam layer and resin layer.

It has been found that coextrusion of the molten polyolefin resin composition 7 containing specific polyethylene resin (B) and specific polypropylene resin, as described hereinafter, and the above-described foamable molten polyethylene resin composition 10 enables to obtain the multi-layer foam sheet 1 that is composed of the foam layer 2 and the resin layer 3 and that has excellent ESCR as well as excellent bonding strength between the foam layer 2 and the resin layer 3.

Polyethylene Resin (B):

The polyethylene resin (B) is selected from the group consisting of low density polyethylene, linear low density polyethylene, high density polyethylene and mixtures thereof.

Polypropylene Resin:

The polypropylene resin that is used together with the polyethylene resin (B) is an ethylene-propylene random copolymer obtained using a metallocene polymerization catalyst and having a melting point of 135° C. or lower. The ethylene-propylene random copolymer may contain, in addition to ethylene and propylene units, other comonomer units such as 1-butene, if desired.

An ethylene-propylene random copolymer having a melting point of higher than 135° C., when used as the polypropylene component of the molten polyolefin resin composition 7, does not show proper fluidity at a temperature that is suited for extruding the foamable molten polyethylene resin composition 10 into the suitable foam layer 2. In this case, therefore, it becomes to excessively increase the pressure within the extruder under which the molten polyolefin resin composition 7 is extruded into the resin layer 3. If the extrusion of the molten polyolefin resin composition 7 containing an ethylene-propylene random copolymer having a melting point of higher than 135° C. into the resin layer 3 is carried out at a temperature that is suited for extruding the foamable molten polyethylene resin composition 10 into the foam layer 2 and that is insufficient for the ethylene-propylene random copolymer to have a suitable fluidity, the ethylene-propylene random copolymer rapidly crystallizes as soon as the molten polyolefin resin composition 7 has been extruded so that undulations are apt to form in the resin layer 3. Also, the viscosity of the molten polyolefin resin composition 7 increases after it has been extruded so that cracks are apt to form in the resin layer 3. Such undulations and cracks not only deteriorate the appearance of the resulting multi-layer foam sheet 1 but also cause formation of cracks in the adjacent foam layer 2, so that the mechanical strength of the multi-layer foam sheet 1 is deteriorated.

The above problems of an increase of extrusion pressure and formation of undulations and/or cracks, which results from the use of an ethylene-propylene random copolymer having a melting point of higher than 135° C., might be avoided, if the extrusion foaming of the foamable molten polyethylene resin composition 10 is carried out at a temperature higher than that which is appropriate for extrusion of the foamable molten polyethylene resin composition 10. In this case, however, the foam layer 2 is likely to cause breakage of its cells, which results in failure to obtain the desired multi-layer foam sheet 1 having a high closed cell content.

In the method of the present invention, the ethylene-propylene random copolymer contained in the molten polyolefin resin composition 7 has a melting point of 135° C. or lower. Therefore, the inventive method does not encounter the above described problems such as formation of undulations and cracks and reduction of the closed cell content. Moreover, the ethylene-propylene random copolymer plays an important role for improving the bonding strength between the foam layer 2 and the resin layer 3 as described hereinafter.

The method of the present invention is characterized by coextruding the above-described foamable molten polyethylene resin composition 10 and the molten polyolefin resin composition 7 containing an ethylene-propylene random copolymer obtained using a metallocene polymerization catalyst and having a melting point of 135° C. or lower, and a polyethylene resin (B) selected from the group consisting of low density polyethylene, linear low density polyethylene, high density polyethylene and mixtures thereof, to form the multi-layer foam sheet 1 having the foam layer 2 formed from the foamable molten polyethylene resin composition 10 and the resin layer 3 formed from and the molten polyolefin resin composition 7. The obtained multi-layer foam sheet 1 has excellent ESCR and excellent bonding strength between the foam layer 2 and resin layer 3.

It is inferred that such excellent ESCR and excellent bonding strength between the foam layer 2 and resin layer 3 can be achieved for the following reasons. Namely, the polyethylene resin (B) and the ethylene-propylene random copolymer obtained using a metallocene polymerization catalyst contained in the molten polyolefin resin composition 7 are finely dispersed in each other in a temperature range in which the extrusion foaming of the foamable molten polyethylene resin composition 10 is not adversely affected. When the molten polyolefin resin composition 7 and foamable molten polyethylene resin composition 10 are coextruded, the polyethylene resin (B) forms a continuous phase at a boundary between the resin layer 2 and the foam layer 3 with the ethylene-propylene random copolymer gradually forming a continuous phase in positions farther from the boundary. It is believed that as a consequence of establishment of such varying continuous phases in the resin layer 3 the multi-layer foam sheet 1 obtained by the method of the present invention shows both excellent ESCR and inter-layer bonding strength in a relatively wide range of blending ratio between the polyethylene resin (B) and the ethylene-propylene random copolymer.

For reasons of obtaining a high closed content in the foam layer 2 and achieving the above-described continuous phase structure in the resin layer 3, it is preferred that the melting point of the ethylene-propylene random copolymer is 130°

C. or less, more preferably 127° C. or less. From the standpoint of drawing the coextruded multi-layer sheet 1 through a cooling device in a stable manner, the melting point of the ethylene-propylene random copolymer is preferably 100° C. or more, more preferably 110° C. or more, still preferably 120° C. or more.

As used herein the term "melting point" of each resin refers to a value as measured by heat flux differential scanning calorimetry in accordance with JIS K7121-1987. Namely, following Adjustment of Test Sample (2) of JIS K7121-1987 (using a cooling rate of 10° C./min), a test sample is pretreated. The pretreated sample is then subjected to measurement to obtain a DSC curve. The peak temperature of an endothermic peak in the DSC curve is the melting point for the purpose of the present invention. When a plurality of endothermic peaks are present in the DSC curve, the peak temperature of the endothermic peak having the largest area represents the melting point.

Blending Ratio Between Polyethylene Resin (B) and Ethylene-Propylene Random Copolymer:

The molten polyolefin resin composition 7 should contain the ethylene-propylene random copolymer in an amount of 20% by weight or more and 80% by weight or less and the polyethylene resin (B) in an amount of 20% by weight or more and 80% by weight or less, wherein the sum of the ethylene-propylene random copolymer and the polyethylene resin (B) is 100% by weight. When the ethylene-propylene random copolymer content and the polyethylene resin (B) content are within the above proportion, it is possible to produce the multi-layer foam sheet 1 that has excellent ESCR and mechanical properties such as hinging property and that permits lamination of an OPP film on its resin layer 3 with improved bonding strength therebetween. From this point of view, the ethylene-propylene random copolymer content and the polyethylene resin (B) content are preferably 30 to 75% by weight and 25 to 70% by weight, respectively, more preferably 50 to 75% by weight and 25 to 50%, respectively, wherein the sum of the ethylene-propylene random copolymer and the polyethylene resin (B) is 100% by weight.

It is preferred that the polyethylene resin (B) used together with the ethylene-propylene random copolymer is a linear low density polyethylene produced by using a metallocene polymerization catalyst for reasons of capability of obtaining high bonding strength between the multi-layer foam sheet 1 and an OPP film. In the case where the molten polyolefin resin composition 7 is comprised of the ethylene-propylene random copolymer obtained using a metallocene polymerization catalyst and having a melting point of 135° C. or lower, and the polyethylene resin (B) that is a linear low density polyethylene produced by using a metallocene polymerization catalyst, it is preferred that the ethylene-propylene random copolymer and the linear low density polyethylene are contained in the molten polyolefin resin composition 7 in amounts of 60 to 80% by weight and 20 to 40% by weight, respectively, more preferably 65 to 80% by weight and 20 to 35%, respectively. When each of the polyethylene resin (B) and the ethylene-propylene random copolymer contained in the molten polyolefin resin composition 7 is a polymer obtained using a metallocene polymerization catalyst, it is possible to obtain a resin layer 3 in which the polyethylene resin (B) and the ethylene-propylene random copolymer are finely dispersed in each other. Such a dispersed state is preferable because sufficiently high bonding strength is achieved between the resin layer 3 and the foam layer 2 and also because the resin layer 3 permits fuse bonding of an OPP film with high bonding strength.

It is also preferred that the molten polyolefin resin composition 7 shows a melt viscosity $\eta_{PO}$ of 500 to 1,500 Pa·s at 190° C. and a shear rate of 100 sec$^{-1}$, because the resin layer 3 obtained therefrom is uniform and smooth and because formation of cracks in the resin layer 3, which adversely affects ESCR, hardly occurs. From this point of view, melt viscosity $\eta_{PO}$ is more preferably 600 to 1,450 Pa·s, still more preferably 700 to 1,400 Pa·s.

In the molten polyolefin resin composition 7, it is further preferred that a ratio $\eta_{PP}/\eta_{PEB}$ of a melt viscosity $\eta_{PP}$ of the ethylene-propylene random copolymer at 190° C. and a shear rate of 100 sec$^{-1}$ to a melt viscosity $\eta_{PEB}$ of the polyethylene resin (B) at 190° C. and a shear rate of 100 sec$^{-1}$ is not lower than 0.4 and not higher than 1.5. When the $\eta_{PP}/\eta_{PEB}$ ratio falls within the above range, the polyethylene resin (B) is properly dispersed in the ethylene-propylene random copolymer. Additionally, during the passage of the molten polyolefin resin composition 7 within the die, that region of the molten polyolefin resin composition 7 which is close to the inside wall of the die probably has a relatively higher concentration of the ethylene-propylene random copolymer than that in the other regions. As a result, even when the molten polyolefin resin composition 7 has relatively a low ethylene-propylene random copolymer content, the resin layer 3 obtained has an increased content of the ethylene-propylene random copolymer content in the surface region thereof. Therefore, an improvement of ESCR and fuse bonding property of the multi-layer foam sheet 1 may be efficiently achieved. From this point of view, it is preferred that the $\eta_{PP}/\eta_{PEB}$ ratio is not lower than 0.4 and not higher than 1.4, more preferably not lower than 0.5 and not higher than 1.3.

Measurement of Melt Viscosity (Pa·s):

The melt viscosity may be measured using a device that may be used for the measurement of the melt tension of the foamable molten resin composition 10, such as Capirograph 1D (manufactured by Toyo Seiki Seisaku-Sho, Ltd.). Concretely, in a cylinder having a cylinder diameter of 9.55 mm and a length of 350 mm is set an orifice having a nozzle diameter of 1.0 mm and a length of 10 mm. The cylinder and the orifice are set at a temperature of 190° C. A specimen in a required amount (about 15 g, for example) is charged into the cylinder and allowed to stand for 4 minutes and melt. The molten resin is then extruded in the form of a string through the orifice at a shear rate of 100 sec$^{-1}$. The viscosity of the molten resin at the time of the extrusion is measured as the melt viscosity.

Metallocene Polymerization Catalyst:

Any metallocene polymerization catalyst conventionally used for producing polyolefin resins may be employed for producing the resins contained in the molten polyolefin resin composition 7. Specific examples of the metallocene catalyst include a catalyst system containing a transition metal complex, in which two cyclopentadienyl rings or substituted cyclopentadienyl rings are bound by covalent bonds to a transition metal selected from Groups IVb, Vb and VIb metals, such as titanium, zirconium, hafnium, vanadium and chromium, and an aluminoxane.

The molten polyolefin resin composition 7 may contain one or more additional resins other than the polyethylene resin (B) and the ethylene-propylene random copolymer as long as the object and effect of the present invention are not adversely affected. Examples of such additional resins include styrene-based resins such as polystyrene, butane-based resins such as polybutene, vinyl chloride resins such as polyvinyl chloride and ionomers. Elastomers or rubbers such as ethylene-octene copolymers and ethylene-propylene rubbers may also be incorporated into the molten polyolefin resin composition 7. The amount of the additional resins is preferably 40 parts by weight or less, more preferably 25 parts by weight or less, particularly preferably 10 parts by weight or less, per 100 parts by weight of the total of the polyethylene resin (B) and the ethylene-propylene random copolymer contained in the molten polyolefin resin composition 7.

The molten polyolefin resin composition 7 may additionally contain one or more additives such as an antioxidant, a thermal stabilizing agent, an antistatic agent, an electric conductivity imparting agent, a UV absorbing agent, a flame retardant and an inorganic filler.

It is preferable to extrude the molten polyolefin resin composition 7 at a temperature of generally 130 to 180° C., more preferably 135 to 170° C., for producing the desirable resin layer 3.

II. Multi-Layer Polyethylene Resin Foam Sheet 1

The above-described method according to the present invention gives a multi-layer foam sheet, an example of which is illustrated in FIG. 1. As described previously, in the multi-layer foam sheet 1 illustrated in FIG. 1, the foam layer 2 is interposed between the two resin layers 3. Because both surfaces of the multi-layer foam sheet 1 are formed of the resin layers 3, the multi-layer foam sheet 1 has good appearance and good ESCR. Although two resin layers 3 are laminated on both sides of the foam layer 2 in the above embodiment, the present invention is not limited only to the above embodiment, i.e. only one side of the foam layer 2 may be laminated with the resin layer 3. Further, the resin layer 3 may be laminated, either directly or indirectly, on at least one side of the foam layer 2. In a case that the resin layer 3 is laminated indirectly on at least one side of the foam layer 2, another resin layer is placed between the foam layer 2 and the resin layer 3.

Basis Weight of Resin Layer 3:

The lamination amount (basis weight) of the resin layer 3 of the multi-layer foam sheet 1 (when the multi-layer foam sheet 1 has two resin layers 3, each of the resin layers 3) is preferably at least 5 g/m², more preferably at least 10 g/m², still more preferably at least 20 g/m². When the basis weight of the resin layer 3 exceeds 500 g/m², the multi-layer sheet has excessively high stiffness and tends to form internal cracks. If such a multi-layer sheet is used for producing a laminated foam sheet by laminating an OPP film thereon, the ESCR of the laminated foam sheet will not be satisfactory. For this reason, the upper limit of the basis weight of the resin layer 3 is generally 500 g/m².

Thickness of Foam Layer 2:

The thickness of the foam layer 2 of the multi-layer foam sheet 1 is preferably 0.2 mm or more, more preferably 0.5 mm or more, for reasons of ensuring satisfactory cushioning property of the multi-layer foam sheet 1. The upper limit of the thickness of the foam layer 2 is preferably 10 mm for reasons of preventing formation of wrinkles of a laminated foam sheet (which is obtained by laminating an OPP film on the resin layer 3 of the multi-layer foam sheet 1) when the laminated foam sheet is bent. Formation of wrinkles is not desired because ESCR is likely to be deteriorated. From this point of view, the thickness of the foam layer 2 is more preferably 5 mm or less, still more preferably 3 mm or less.

The lamination amount (basis weight) of the resin layer 3 and the thickness of the foam layer 2 may be adjusted during coextrusion of the molten polyolefin resin composition 7 and the foamable molten polyethylene resin composition 10, for example, by adjustment of the discharging amounts through the extrusion die, by controlling the drawing speed of the extruded foam sheet or by any other suitable method.

The thicknesses of the foam layer 2 and the resin layer 3 of the multi-layer foam sheet 1 are measured as follows. The multi-layer foam sheet is cut in a transverse direction that is normal to the extrusion direction. The resulting cross-section is photographed with a photomicroscope at ten positions which are transversely equally spaced apart from each other. In each of the ten photo images, the thickness of the multi-layer foam sheet 1 and the resin layer 3 are measured. The arithmetic mean of the ten measurement values of the multi-layer foam sheet 1 represents the thickness of the multi-layer foam sheet 1, while the arithmetic mean of the ten measurement values of the resin layer 3 represents the thickness of the resin layer 3. The thickness of the foam layer 2 is a value obtained by subtracting the thickness of the resin layer 3 (or total thicknesses of the resin layers 3 when the multi-layer foam sheet 1 has two resin layers 3) from the thickness of the multi-layer foam sheet 1.

Apparent Density of Foam Layer 2:

The foam layer 2 preferably has an apparent density of 90 kg/m³ or more and 600 kg/m³ or less. When the apparent density of the foam layer 2 is less than 90 kg/m³, there is a danger that the foam layer 2 fails to have a high closed cell content. Too high an apparent density of the foam layer 2 above 600 kg/m³ will cause a danger that the foam layer 2 fails to show satisfactory cushioning property and heat insulation property. From the above points of view, the apparent density of the foam layer 2 is more preferably 120 kg/m³ or more, still more preferably 150 kg/m³ or more, with the upper limit being more preferably 550 kg/m³, still more preferably 500 kg/m³.

The apparent density (kg/m³) of the foam layer 2 is calculated by dividing the basis weight (g/m²) of the foam layer 2 by the thickness (m) of the foam layer with appropriate unit conversion. The thickness of the foam layer 2 is measured in the same manner as described above. The basis weight of the foam layer 2 is determined by subtracting the basis weight of the resin layer 3 (or total basis weights of the resin layers 3 when the multi-layer foam sheet 1 has two resin layers 3) from the basis weight of the multi-layer foam sheet 1. The basis weight (g/m²) of the multi-layer foam sheet 1 is measured as follows. The multi-layer foam sheet 1 as produced is cut along two parallel lines that are spaced apart from each other by a distance of 0.1 m and that extends in the transverse direction which is perpendicular to the extrusion direction thereof to obtain a test sample which has a thickness equal to that of the multi-layer foam sheet 1, a length ($L_1$ m) equal to the transverse length of the multi-layer foam sheet 1, a width of 0.1 m. Thus, the test sample has an area of 0.1 $L_1$ m². The test sample is then measured for its weight. The basis weight (g/m²) of the multi-layer foam sheet 1 is obtained by dividing the weight thereof by the area thereof (0.1 $L_1$ m²).

The basis weight (g/m²) of the resin layer 3 is calculated by multiplying the thickness thereof (measured in the same manner as described above) by the density of the resin components constituting the resin layer 3 (namely, density of the resin components constituting the molten polyolefin resin composition 7). When the resin layer 3 contains a large amount (for example 50% by weight or more) of inorganic matters, however, the basis weight of the resin layer 3 is calculated by subtracting, from the basis weight of the multi-layer foam sheet 1 which is determined by the above-described method, the basis weight of the foam layer 2 which is measured in the same manner as that for the above-described measurement of the basis weight of the multi-layer foam sheet 1 except that the test sample is obtained from a single layer sheet obtained by removing the resin layer 3 from the multi-layer foam sheet 1.

Closed Cell Content of Foam Layer 2:

The closed cell content (%) of the foam layer 2 of the multi-layer foam sheet 1 is preferably 70% or more, more preferably 80% or more, still more preferably 85% or more, for reasons of improved cushioning properties. Further, when the multi-layer foam sheet 1 or a laminated foam sheet composed of the multi-layer foam sheet 1 and an OPP film laminated thereon is used as a material that is required to have sufficient impact resistance, such as a packing material or partitioning material, the closed cell content of the foam layer 2 is desired to have a closed cell content of 80% or more.

Determination of Closed Cell Content (%):

As used herein, the closed cell content refers to a value as calculated by the formula (1) below.

$$\text{Closed cell content (\%)} = (V_x - W/\rho) \times 100/(V_a - W/\rho) \quad (1)$$

wherein:

$V_x$ is a true volume (L) of a specimen of the multi-layer foam sheet 1 which is measured according to Procedure C of ASTM D-2856-70 using a densitometer (e.g. Air Comparison Pycnometer Model-930 manufactured by Toshiba Beckman Inc.) and which is a sum of a total volume of the closed cells and the volume of the resin constituting the multi-layer foam sheet 1;

$V_a$ represents an apparent volume (L) of the specimen determined from the outer dimension of thereof;

W is a weight (g) of the specimen measured after defoaming the specimen using a heat press;

$\rho$ represents a density (g/L) of the specimen measured after defoaming the specimen using a heat press.

In the measurement of the true volume of the specimen using a densitometer, it is important to place the specimen in a sample cup of the densitometer in an uncompressed state. Thus, the multi-layer foam sheet 1 is cut to obtain a plurality of cut pieces each having an appropriate size, and the cut pieces are placed in a stacked state within the sample cup. When the inside volume of the sample cup is about 25 cm$^3$, for example, the multi-layer foam sheet 1 is cut into a plurality of cut pieces each having a length of 40 mm, a width of 25 mm and a thickness equal to that of the multi-layer foam sheet 1, and an appropriate number of the cut pieces are placed in a stacked state in the sample cup so that the apparent volume of the stack is about 25 cm$^3$.

The closed cell content of the foam layer 2 may be controlled as appropriate by, for example, the adjustment of an amount of the cell controlling agent and adjustment of the extrusion temperatures of the molten polyolefin resin composition 7 and the foamable molten polyethylene resin composition 10.

III. Use of Multi-Layer Polyethylene Resin Foam Sheet 1

Figure 3:
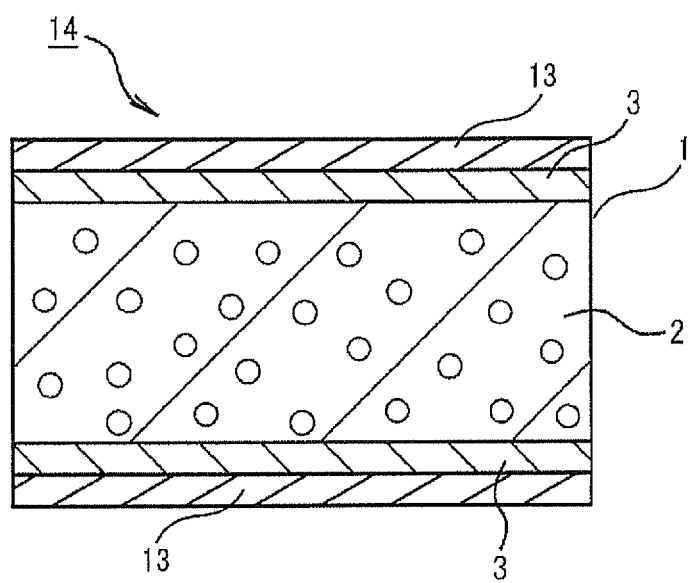
FIG. 3 is a schematic cross-sectional view showing an embodiment of a laminated foam sheet having a multi-layer polyethylene resin foam sheet obtained by a method according to the present invention.

Examples of how the Multi-Layer Foam Sheet 1 is Used:

Because of its excellent ESCR, the multi-layer foam sheet 1 may be used by itself as a packing material, a partition material, etc. Further, since the resin layer 3 of the multi-layer foam sheet 1 shows good bonding property to an OPP film, the multi-layer foam sheet 1 may be suited for preparing a laminated foam sheet 14 as illustrated in FIG. 3. In the illustrated embodiment, the laminated foam sheet 14 has two OPP films 13 and 13 laminated on the resin layers 3 and 3 between which the foam layer 2 is interposed. If desired, however, one of the two OPP films 13 and 13 may be omitted. Namely, it is possible to laminate only one OPP film 13 to one of the resin layers 3.

Interlayer Bonding Strength in Multi-Layer Foam Sheet 1 and Laminated Foam Sheet 14:

The bonding strength between the foam layer 2 and the resin layer 3 of the multi-layer foam sheet 1 is preferably 4 N/cm or more, more preferably 6 N/cm or more, still more preferably 8 N/cm or more. It is particularly preferred that the bonding strength between the foam layer 2 and the resin layer 3 is such that the two layers are not peeled off from each other but cause material failure when the multi-layer foam sheet 1 is subjected to a 180° peel test. The bonding strength between the OPP film 13 and the resin layer 3 of the laminated foam sheet 14 is preferably 4 N/cm or more, more preferably 6 N/cm or more, still more preferably 8 N/cm or more. The term "bonding strength" as used herein refers to a peel strength as measured by 180° peel test as referenced in JIS K6854-2 (1999).

EXAMPLES

The following examples and comparative examples will further illustrate the present invention.

Raw Material Resins:

Raw material resins used for producing multi-layer polyethylene resin foam sheets in the following examples and comparative examples were Resins E1 to E5, P1, P2 and B1 to B3, details of which are summarized in Table 1

TABLE 1

| Resin | Grade Name or Blend Ratio | Maker | Kind | Density (g/L) | Melting Point (° C.) | MFR (g/10 min) | Viscosity (Pa · s) |
|---|---|---|---|---|---|---|---|
| E1 | NC564A | Japan Polyethylene Corporation | Metallocene PE-LLD | 920 | 120 | 3.5 | 1,426 |
| E2 | NUC-8321 | Dow Chemical Company | PE-LD | 920 | 111 | 2.4 | 787 |
| E3 | NUC-8008 | Dow Chemical Company | PE-LD | 920 | 107 | 4.7 | 593 |
| E4 | NIPOLON HARD 2500 | Tosoh Corporation | PE-HD | 960 | 131 | 8 | 629 |
| E5 | F102 | Sumitomo Chemical Co., Ltd. | PE-LD | 920 | 109 | 0.3 | 1,754 |
| P1 | WFX4T | Japan Polychem | Metallocene Random PP | 900 | 123 | — | 832 |
| P2 | J532MZV | Prime Polymer Co., Ltd. | General Random PP | 900 | 143 | — | 778 |

TABLE 1-continued

| Resin | Grade Name or Blend Ratio | Maker | Kind | Density (g/L) | Melting Point (° C.) | MFR (g/10 min) | Viscosity (Pa · s) |
|---|---|---|---|---|---|---|---|
| B1 | E2/E4 = 30/70 | — | Blend | — | — | — | 676 |
| B2 | E2/E4 = 50/50 | — | Blend | — | — | — | 708 |
| B3 | E3/E4 = 30/70 | — | Blend | — | — | — | 618 |

In Table 1, Metallocene PE-LLD means linear low density polyethylene produced using a metallocene polymerization catalyst, PE-LD means low density polyethylene, PE-HD means high density polyethylene, Metallocene Random PP means ethylene-propylene random copolymer produced using a metallocene polymerization catalyst, and General Random PP means ethylene-propylene random copolymer produced using a Ziegler-Natta catalyst.

In Table 1, Resin B1 is a blend of Resin E2 and Resin E4 with a blending ratio E2/E4 of 30:70, Resin B2 is a blend of Resin E2 and Resin E4 with a blending ratio E2/E4 of 50:50, and Resin B3 is a blend of Resin E3 and Resin E4 with a blending ratio E3/E4 of 30:70. The viscosity in Table 1 refers to melt viscosity (Pa·s).

Coextrusion Device:

The multi-layer polyethylene resin foam sheets were produced using a coextrusion device in which a first extruder (tandem extruder composed of an extruder with an inside diameter of 90 mm and an extruder with an inside diameter of 120 mm) for forming a foam layer and a second extruder (a single extruder with an inside diameter of 50 mm) for forming resin layers are connected to a single circular die with a die lip diameter of 10 mm.

Example 1

Preparation of Foamable Molten Polyethylene Resin Composition

As shown in Table 2, Resin E2 was used as polyethylene resin (A). 100 Parts by weight of Resin E2 were fed together with 0.2 part by weight of carbon dioxide as a physical blowing agent and 0.7 part by weight of a mixture containing monosodium citrate and sodium hydrogen carbonate (Trademark: FINECEL MASTER SSC-PO217K, manufactured by Dainichiseika Color and Chemicals Mfg. Co., Ltd.) as a cell controlling agent, to the first extruder for forming a foam layer and melted and kneaded to obtain a foamable molten polyethylene resin composition. The foamable molten polyethylene resin composition introduced into the circular die was adjusted to a temperature of 121° C.

Preparation of Molten Polyolefin Resin Composition:

Resin E1 was used as polyethylene resin (B) in an amount of 70% by weight and Resin P1 was used as an ethylene-propylene random copolymer in an amount of 30% by weight as shown in Table 2. Resin E1 and Resin P1 were fed to the second extruder and melted and kneaded to obtain a molten polyolefin resin composition. The molten polyolefin resin composition introduced into the circular die was adjusted to a temperature of 162° C.

TABLE 2

| | Foam Layer | | Resin Layer | | | | | |
|---|---|---|---|---|---|---|---|---|
| | | | Polyolefin Resin | | | | | |
| | | | Polyethylene Resin (B) | | Polypropylene Resin | | | |
| | Polyethylene Resin (A) | Apparent Density (kg/m³) | Thickness (mm) | Resin | Amount (wt %) | Resin | Melting Point (° C.) | Amount (wt %) | Viscosity (Pa · s) |
| Ex. 1 | E2 | 460 | 2 | E1 | 70 | P1 | 123 | 30 | 1,250 |
| Ex. 2 | E2 | 460 | 2 | E1 | 50 | P1 | 123 | 50 | 1,130 |
| Ex. 3 | E2 | 460 | 2 | E1 | 30 | P1 | 123 | 70 | 1,010 |
| Ex. 4 | E2 | 460 | 2 | E1 | 20 | P1 | 123 | 80 | 950 |
| Ex. 5 | E2 | 460 | 2 | E2 | 30 | P1 | 123 | 70 | 820 |
| Ex. 6 | E2 | 260 | 2 | E1 | 30 | P1 | 123 | 70 | 1,010 |
| Ex. 7 | E2 | 260 | 3 | E1 | 70 | P1 | 123 | 30 | 1,250 |
| Ex. 8 | B1 | 460 | 2 | E1 | 70 | P1 | 123 | 30 | 1,250 |
| Ex. 9 | B2 | 460 | 2 | E1 | 70 | P1 | 123 | 30 | 1,250 |
| Ex. 10 | E2 | 460 | 2 | E5 | 70 | P1 | 123 | 30 | 1,477 |
| Comp. 1 | E2 | 460 | 2 | — | — | — | — | — | — |
| Comp. 2 | E2 | 460 | 2 | B3 | 100 | — | — | — | 618 |
| Comp. 3 | E2 | 460 | 2 | E1 | 90 | P1 | 123 | 10 | 1,366 |
| Comp. 4 | E2 | 460 | 2 | — | — | P1 | 123 | 100 | 832 |
| Comp. 5 | E2 | 460 | 2 | E1 | 70 | P2 | 143 | 30 | 1,231 |
| Comp. 6 | B1 | 460 | 2 | E1 | 70 | P2 | 143 | 30 | 1,231 |

Production of Multi-Layer Polyethylene Resin Foam Sheet:

The melt streams of the foamable molten polyethylene resin composition and the molten polyolefin resin composition from the first and second extruders were combined within the circular die and coextruded through the die lip at a discharge rate of 110 kg/hour to obtain a tubular multi-layer foam sheet composed of a foam layer and two resin layers laminated on both sides of the foam layer. The above discharge rate of 110 kg/hour is a sum of the discharge rate (100 kg/hour) of the foamable molten polyethylene resin composition used to form the foam layer and the discharge rate (10 kg/hour) of the molten polyolefin resin composition used to form the two resin layers.

The discharging rates of the molten polyolefin resin composition and foamable molten polyethylene resin composition in the coextrusion stage were controlled as above so that the total basis weight (g/m²) and respective basis weights (g/m²) of the resin layers and foam layer were as shown in Table 3. The tubular multi-layer foam sheet was drawn over a cooling mandrel having a diameter of 212 mm and a length of 1,500 mm and cooled by contact with the outer periphery thereof. The cooled foam sheet was then slit in the extrusion direction to obtain a flat multi-layer polyethylene resin foam sheet.

In Table 2, the viscosity (Pa·s) indicates a melt viscosity $\eta_{PO}$ of the molten polyolefin resin composition. In Tables 2 and 3, "Ex." and "Comp." indicate Example and Comparative Example, respectively.

Examples 2 to 4

Multi-layer polyethylene resin foam sheets were produced in the same manner as that of Example 1 except that using amounts of Resin E1 and Resin P1 were changed as shown in Table 2.

Example 5

Multi-layer polyethylene resin foam sheets were produced in the same manner as that of Example 3 except that Resin E2 was substituted for Resin E1 as shown in Table 2.

Example 6

A multi-layer polyethylene resin foam sheet was produced in the same manner as that in Example 3 except that carbon dioxide was used in an amount of 0.5 part by weight and the discharging rates of the molten polyolefin resin composition and foamable molten polyethylene resin composition were changed so that the basis weights of the foam layer and resin layer were changed as shown in Table 3.

Example 7

A multi-layer polyethylene resin foam sheet was produced in the same manner as that in Example 1 except that carbon dioxide was used in an amount of 0.5 part by weight and the discharging rates of the molten polyolefin resin composition and foamable molten polyethylene resin composition were changed so that the basis weights of the foam layer and resin layer were changed as shown in Table 3.

Examples 8 and 9

Multi-layer polyethylene resin foam sheets were produced in the same manner as that in Example 1 except that Resin B1 (Example 8) and Resin B2 (Example 9) were substituted for Resin E2 as shown in Table 2 and that the foamable molten polyethylene resin composition introduced into the circular die was adjusted to a temperature of 135° C.

Example 10

A multi-layer polyethylene resin foam sheet was produced in the same manner as that in Example 1 except that Resin E5 was substituted for Resin E1 as shown in Table 2.

Comparative Example 1

The procedures Example 1 was repeated in the same manner as described except that no resin layers were formed, thereby obtaining a polyethylene resin foam sheet composed only of a foam layer.

Comparative Example 2

A multi-layer polyethylene resin foam sheet was produced in the same manner as that in Example 1 except that no ethylene-propylene random copolymer was incorporated into the molten polyolefin resin composition and that Resin B3 was substituted for Resin E1.

Comparative Example 3

A multi-layer polyethylene resin foam sheet was produced in the same manner as that in Example 1 except that using amounts of Resin E1 and Resin P1 were changed as shown in Table 2.

Comparative Example 4

A multi-layer polyethylene resin foam sheet was produced in the same manner as that in Example 1 except that no polyethylene resin (B) was incorporated into the molten polyolefin resin composition.

Comparative Example 5

A multi-layer polyethylene resin foam sheet was produced in the same manner as that in Example 1 except that Resin P2 was substituted for Resin P1 as shown in Table 2. However, cracks were formed in surfaces of the foam sheet and the foam sheet had poor appearance.

Comparative Example 6

A multi-layer polyethylene resin foam sheet was produced in the same manner as that in Example 8 except that Resin P2 was substituted for Resin P1 as shown in Table 2. However, cracks were formed in surfaces of the foam sheet and the foam sheet had poor appearance.

Measurement of Physical Properties of Multi-Layer Polyethylene Resin Foam Sheets:

The multi-layer polyethylene resin foam sheets produced in Examples 1 to 10 and Comparative Examples 1 to 6 were each measured for various physical properties thereof including a thickness, an apparent density and a closed cell content of the foam layer thereof. Also carried out were measurement of ESCR, a bonding strength between the foam layer and resin layer and a bonding strength to an OPP film of each of the multi-layer polyethylene resin foam sheets produced in Examples 1 to 10 and Comparative Examples 1 to 4.

The thickness (mm) and the apparent density (kg/m³) of the foam layer were measured by methods described previously. The closed cell content (%) of the foam layer of each multi-layer polyethylene resin foam sheet was determined as follows. In the multi-layer polyethylene resin foam sheet, three positions are selected at random. A plurality of cut pieces were then cut out from regions of the foam sheet surrounding each of the three selected positions, whereby three sets of cut pieces (each set being composed of a plurality of cut pieces) were obtained. An appropriate number of cut pieces of each set were placed in a stacked state in a sample cup of a densitometer and a true volume of the foam sheet was measured according to Procedure C of ASTM D-2856-70 using the densitometer in the manner as described previously. An arithmetic mean of the three true volume values obtained for the three sets was used as the true volume ($V_x$) of the foam sheet. From the measured true volume ($V_x$), the closed cell content was calculated according to the above formula (1). The measured results of the thickness (mm), apparent density (kg/m$^3$) and closed cell content (%) are summarized in Tables 2 and 3.

The ESCR, bonding strength between the foam layer and resin layer and bonding strength to an OPP film of each of the multi-layer polyethylene resin foam sheets produced in Examples 1 to 10 and Comparative Examples 1 to 4 were measured by the following methods.

Measurement of ESCR:

Five test sheets each having a length of 50 mm and a width of 30 mm were cut out from each multi-layer polyethylene resin foam sheet. The thickness of each test sheet was equal to that of the corresponding multi-layer polyethylene resin foam sheet. The test sheet was wound around a steel pipe having an outer diameter of 8 mm so that the surface of the resin layers of the test sheet to be subjected to the ESCR measurement faced outward. The winding of the test sheet was carried out in such a manner that the test sheet was in close contact with the pipe in order to minimize the formation of a gap therebetween. The test sheet was then fixed using a stapler. In this manner, five test pieces each formed of the steel pipe and the test sheet wound there around were obtained.

The five test pieces were then immersed in an aqueous solution which was maintained at 50° C. and in which a surfactant (NONIPOL 160 (trademark) manufactured by Sanyo Chemical Industries, Ltd.) had been dissolved in an amount of 10% by weight. The state changes of the resin layers exposed on the outer peripheries of the five test pieces were then observed with the naked eyes. ESCR of the multi-layer polyethylene resin foam sheet was determined in terms of the period of time (hr) which had passed before cracking of the resin layers occurred in three or more test pieces. The results are shown in Table 3. In Table 3, ">1440" means that ESCR is more than 1,440 hours; i.e. no environmental stress cracking occurred in the resin layers of at least two test pieces when 1,440 hours had passed from the start of the test.

Bonding Strength Between Foam Layer and Resin Layer:

The bonding strength between the foam layer and the resin layer of each multi-layer polyethylene resin foam sheet was measured as follows. Five test sheets each having a length of 200 mm and a width of 25 mm were cut out from each multi-layer polyethylene resin foam sheet. The thickness of each test sheet was equal to that of the corresponding multi-layer polyethylene resin foam sheet. Each of the test sheets was subjected to 180° peel test for measuring a peel strength between the foam layer and resin layer according to JIS K6854-2 (1999). An average of the peel strengths of the five test sheets is the bonding strength (N/cm) between the foam layer and resin layer. The results are shown in Table 3.

Bonding Strength to OPP Film:

The bonding strength of each multi-layer polyethylene resin foam sheet to an OPP film was measured as follows. A test sheet having a length of 500 mm and a width of 500 mm was cut out from each multi-layer polyethylene resin foam sheet. The thickness of the test sheet was equal to that of the multi-layer polyethylene resin foam sheet. An OPP film (PYLEN (trademark) film OT P8128 manufactured by Toyobo Co., Ltd.) was superimposed on one side of the test sheet. This was then passed through a nip between a first roll maintained at 170° C. and a second roll maintained at 30° C. with the OPP film in contact with the first roll and the test sheet in contact with the second roll, to fuse bond the OPP film to the resin layer of the test sheet, thereby obtaining a laminated sheet. The transferring speed through the nip was 6 m/min and the gap between the first and second rolls was 60% of the thickness of the test sheet From the obtained laminated sheet, five test sheets each having a length of 200 mm and a width of 25 mm were cut out. The thickness of each test sheet was equal to that of the laminated sheet (the total thickness of the OPP film and the multi-layer polyethylene resin foam sheet). Each of the test sheets was subjected to 180° peel test for measuring a peel strength between the OPP film and resin layer according to JIS K6854-2 (1999). An average of the peel strengths of the five test sheets is the bonding strength (N/cm) of the multi-layer polyethylene resin foam sheet to the OPP film. The results are shown in Table 3.

From the results shown in Table 3, it is seen that the multi-layer foam sheets of Examples 1 to 10 have superior ESCR and bonding strength between their resin layers and foam layers as compared with those of Comparative Examples 1 to 3. The multi-layer foam sheet of Comparative Example 4 had so low bonding strength between the resin layer and the foam layer that inter-layer peeling occurred with only a low peel force.

TABLE 3

| | Composite Polyethylene Resin Foam Sheet | | | | | |
|---|---|---|---|---|---|---|
| | Total Basis Weight (g/m$^2$) | Basis Weight (g/m$^2$) [Resin Layer/Foam Layer/Resin Layer] | Closed Cell Content (%) | ESCR (hr) | Bonding Strength between Foam Layer and Resin Layer (N/cm) | Bonding Strength to OPP Film (N/cm) |
| Ex. 1 | 920 | 42/836/42 | 96 | >1,440 | no peeling | 4.6 |
| Ex. 2 | 920 | 42/836/42 | 96 | >1,440 | no peeling | 5.5 |
| Ex. 3 | 920 | 42/836/42 | 96 | >1,440 | no peeling | 19 |
| Ex. 4 | 920 | 42/836/42 | 96 | >1,440 | 9.4 | no peeling |
| Ex. 5 | 920 | 42/836/42 | 96 | >1,440 | no peeling | 6.5 |
| Ex. 6 | 530 | 24/482/24 | 95 | >1,440 | no peeling | 17.5 |
| Ex. 7 | 780 | 35/710/35 | 92 | >1,440 | no peeling | 4.2 |
| Ex. 8 | 920 | 42/836/42 | 88 | >1,440 | no peeling | 4.9 |
| Ex. 9 | 920 | 42/836/42 | 85 | >1,440 | no peeling | 4.9 |
| Ex. 10 | 920 | 42/836/42 | 73 | >1,440 | no peeling | 4.2 |
| Comp. 1 | 920 | — | 96 | 144 | — | no bonding |
| Comp. 2 | 920 | 42/836/42 | 98 | 144 | no peeling | no bonding |
| Comp. 3 | 920 | 42/836/42 | 96 | 144 | no peeling | no bonding |

TABLE 3-continued

| | | | Composite Polyethylene Resin Foam Sheet | | |
|---|---|---|---|---|---|
| | Total Basis Weight (g/m²) | Basis Weight (g/m²) [Resin Layer/Foam Layer/Resin Layer] | Closed Cell Content (%) | ESCR (hr) | Bonding Strength between Foam Layer and Resin Layer (N/cm) | Bonding Strength to OPP Film (N/cm) |
| Comp. 4 | 920 | 42/836/42 | 93 | >1,440 | 0.26 | no peeling |
| Comp. 5 | 920 | 42/836/42 | 56 | not evaluated | not evaluated | not evaluated |
| Comp. 6 | 920 | 42/836/42 | 62 | not evaluated | not evaluated | not evaluated |

In Table 3, "total basis weight" is a sum of the basis weights of the (resin layer)/(foam layer)/(resin layer) constituting the multi-layer foam sheet. The basis weights of respective layers are also shown in Table 3. In the column of "Bonding Strength between Foam layer and Resin layer" of Table 3, "no peeling" indicates that no inter-layer peeling occurred between the foam layer and resin layer but material failure occurred in the foam layer at the time of the 180° peel test. In the column of "Bonding Strength to OPP Film", "no peeling" indicates that no inter-layer peeling occurred between the OPP film and resin layer but inter-layer peeling occurred between the foam layer and the resin layer.

In a sixth aspect, the present invention provides a coextruded multi-layer polyethylene resin foam sheet, comprising a polyethylene resin foam layer and a polyolefin resin layer laminated on at least one side of the polyethylene resin foam layer, said polyethylene resin foam layer comprising a polyethylene resin (A) containing a low density polyethylene, and said polyolefin resin layer comprising 20 to 80% by weight of an ethylene-propylene random copolymer obtained using a metallocene polymerization catalyst and having a melting point of 135° C. or lower, and 20 to 80% by weight of a polyethylene resin (B) selected from the group consisting of low density polyethylene, linear low density polyethylene, high density polyethylene and mixtures thereof, wherein the sum of the ethylene-propylene random copolymer and the polyethylene resin (B) is 100% by weight.

In a seventh aspect, the present invention provides a coextruded multi-layer polyethylene resin foam sheet according to the above sixth aspect, wherein said polyolefin resin layer is laminated on each of the both sides of said polyethylene resin foam layer.

In an eighth aspect, the present invention provides a laminated foam sheet, comprising a coextruded multi-layer polyethylene resin foam sheet according to the above sixth aspect, and an oriented polypropylene film laminated on said polyolefin resin layer by fusion bonding.

In a ninth aspect, the present invention provides a laminated foam sheet, comprising a coextruded multi-layer polyethylene resin foam sheet according to the above seventh aspect, and an oriented polypropylene film laminated on each of said polyolefin resin layers by fusion bonding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein. The teachings of Japanese Patent Application No. 2012-201181, filed on Sep. 13, 2012, inclusive of the specification, claims and drawings, are hereby incorporated by reference herein.

What is claimed is:

1. A method for producing a multi-layer polyethylene resin foam sheet having a polyethylene resin foam layer and a polyolefin resin layer laminated on at least one side of the polyethylene resin foam layer, comprising the steps of:

providing a foamable molten polyethylene resin composition comprising a polyethylene resin (A) comprising a low density polyethylene, and a physical blowing agent;

providing a molten polyolefin resin composition comprising:

20 to 80% by weight of an ethylene-propylene random copolymer obtained using a metallocene polymerization catalyst and having a melting point of 135° C. or lower, and 20 to 80% by weight of a polyethylene resin (B) selected from the group consisting of low density polyethylene, linear low density polyethylene, high density polyethylene and mixtures thereof, wherein a sum of the ethylene-propylene random copolymer and the polyethylene resin (B) is 100% by weight, and a ratio $\eta_{PP}/\eta_{PEB}$ of a melt viscosity $\eta_{PP}$ of the ethylene-propylene random copolymer at 190° C. and a shear rate of 100 sec$^{-1}$ to a melt viscosity $\eta_{PEB}$ of the polyethylene resin (B) at 190° C. and at a shear rate of 100 sec$^{-1}$ is not lower than 0.4 and not higher than 1.5;

a bonding strength between a polyethylene resin foam layer and a polyolefin resin layer of the multi-layer foam sheet is 4 N/cm or more; and the bonding strength is measured by 180 peel test as referenced in HS K6854-2(1999); and coextruding the foamable molten polyethylene resin composition and the molten polyolefin resin composition to form the multi-layer polyethylene resin foam sheet, wherein the foamable molten polyethylene resin composition forms the polyethylene resin foam layer and the molten polyolefin resin composition forms the polyolefin resin layer.

2. The method according to claim 1, wherein the molten polyolefin resin composition has a melt viscosity $\eta_{PO}$ of not lower than 500 Pa·s and not higher than 1,500 Pa·s at a temperature of 190° C. and a shear rate of 100 sec$^{-1}$.

3. The method according to claim 1, wherein the polyethylene resin (B) is a linear low density polyethylene obtained using a metallocene polymerization catalyst.

4. The method according to claim 1, wherein the polyethylene resin foam layer has an apparent density of not lower than 90 kg/m$^3$ and not higher than 600 kg/m$^3$ and a closed cell content of not lower than 70%.

* * * * *